United States Patent Office 3,243,421
Patented Mar. 29, 1966

3,243,421
CATALYSTS FOR POLYMERIZATION
Adam Orzechowski, Waltham, Mass., assignor to Cabot Corporation, Boston, Mass., a corporation of Delaware
No Drawing. Filed July 31, 1963, Ser. No. 299,104
14 Claims. (Cl. 260—93.7)

This invention relates to the polymerization and copolymerization of mono- and di-olefins such as ethylene, propylene, butene-1, styrene, isoprene and butadiene and includes within its scope novel catalysts for such polymerization reactions.

Accordingly, it is a principal object of the present invention to provide new and useful catalysts.

Other objects of the present invention will in part be obvious and will in part appear hereinafter.

In accordance with the present invention, mono- and di-olefins are polymerized or copolymerized by catalysts comprising an activated product of the reaction between (a) a hydrolyzed reaction product of hydroxyl groups on the surface of finely-divided inorganic solid and certain halohydrides of Group IVb metals, and (b) a Group IVa, Va, or VIa transition metal halide or oxyhalide. The polymerization or copolymerization reaction can be effected at suitable temperatures within the range of from about $-25°$ C. to about $250°$ C., and pressures ranging from below atmospheric upwardly to any desired maximum presure, for example, 30,000 p.s.i.g. or even higher pressures.

Inorganic solids suitable for the purposes of the present invention generally include any inorganic solid which is available in finely-divided particulate form with hydroxyl groups on the surface thereof. For example, metal oxides such as alumina, zirconia, silica, thoria and magnesia, silicates such as chrysotile, actinolite and crocidolite, and aluminates such as corundum and bauxite are all generally suitable for the purposes of the present invention. It should be noted, however, that the ultimate efficiency of the catalyst components produced in accordance with the present invention is generally highly dependent upon the number of surface hydroxyl groups present per gram of finely-divided inorganic solid. Accordingly, in preparing the catalysts of the present invention, it should be borne in mind that the smaller the average particle diameter of the solid and the larger the quantity of hydroxyl groups on the surface thereof, the greater will be the potential activity and efficiency of the catalysts producible therefrom. Therefore, it is important to use as the starting material particulate, finely-divided solids having (a) an average ultimate particle diameter of less than about 1 micron, and preferably less than about 0.1 micron and (b) a hydroxyl group concentration on the surface thereof of at least about 0.1 milliequivalent per gram.

Halohydrides of Group IVb metals suitable for the purposes of the present invention are the compounds conforming to the formula $$MH_2X_2$$

wherein each H is hydrogen; each X is any halogen; and M is a metal chosen from the group consisting of the quadrivalent metals of Group IVb of the Mendeleev Periodic System. It is pointed out that while, strictly speaking, silicon and germanium are not metals, it is intended, and, therefore, it should be understood, that for the purposes of the present specification and claims silicon and germanium are metals.

Specific examples of compounds conforming to the formula $$MH_2X_2$$

which are suitable for the purposes of the present invention are dichlorosilane—$Cl_2SiH_2$; dibromosilane—$Br_2SiH_2$ 

diiodosilane—$I_2SiH_2$; dichlorogermane—$Cl_2GeH_2$; dibromogeramine—$Br_2GeH_2$; dichlorostannane—$Cl_2SnH_2$; and the like.

The conditions under which reaction between the halohydride and hydroxyl groups on the surface of the finely-divided inorganic solid can be accomplished are subject to considerable variation. However, in order to obtain a catalyst component with exceptionally high activity and reproducible character and performance it has been found to be all important that said finely-divided inorganic solid be essentially dry and anhydrous (i.e., free of molecular water in any form) at the time it is brought into contact with the halohydride.

In addition, it is recommended that the reaction of hydroxyl groups on the surface of the inorganic solid and the halohydride be accomplished so as to allow gaseous by-products of the reaction to be eliminated from the reaction zone in order to thereby insure that said reaction goes to completion. Generally, the said reaction can be carried out by contacting said inorganic solid with the halohydride, preferably in a solution thereof in an inert hydrocarbon medium, and maintaining the two reactants in intimate contact for a period of time sufficient to effect the desired chemical reaction resulting in the chemical bonding of the halohydride to the inorganic solid.

Elimination of the by-products of the reaction from the reaction zone, i.e., from the reaction medium, can be accomplished in any convenient manner such as, by sweeping the reaction vessel with an inert gas, by carrying out the reaction at sufficiently elevated temperatures while stirring to drive off by-products, and by complexing or reacting said by-products with suitable substances such as tertiary amines, tertiary arsines, tertiary phosphines, terpenes, terpinenes, tetra-substituted hydrazines, carbides such as calcium carbide, and other substances which will react or complex with said by-products and thereby eliminate them.

It is pointed out that the halohydrides of the present invention must comprise at least two halogen atoms and two hydrogen atoms in order to ultimately produce the efficient catalysts of the present invention. Thus, one halogen is necessary if a reaction between the halohydride and a hydroxyl group on the surface of the inorganic solid is to occur; another halogen atom is required in order that replacement thereof by a hydroxyl group may be subsequently effected as will be explained in more detail hereinafter. Finally, at least two hydrogen atoms are normally necessary for subsequent activation to produce an efficient catalyst.

Generally speaking, almost any temperature between about $0°$ C. and about $300°$ C. and even higher temperatures can be used satisfactorily, but the range from about $20°$ C. to about $125°$ C. is generally preferred for the reaction of the halohydride and hydroxyl groups. Assuming provision is made for intimate contact of the dry inorganic solid and the halohydride, the minimum time required to accomplish the chemical reaction will vary from periods of the order of about 10 hours at $25°$ C. to periods of the order of about 30 minutes at temperatures of $150°$ C. or over. Substantially higher temperatures are normally completely needless and therefore of little or no interest.

Alternately, the reaction can also be carried out by other means, such as by exposing the inorganic solid to vapors of the halohydride, provided, of course, that said solid is exposed to sufficient quantities of vapors of the halohydride under conditions of time and temperature that will foster reaction. Said vapors can be supplied under their own vapor pressures using partial vacuum if necessary, or with the aid of a dry, inert carrier gas such as nitrogen. This vapor phase treatment can be accomplished in any suitable manner such as by circulating the vapors through the particulate solid in a fixed bed reactor.

It is believed, though there is no intention to be bound by this explanation, that the type of reaction that occurs is correctly illustrated by the following illustrative equations, wherein silica represents the finely-divided inorganic solid bearing hydroxyl groups on the surface thereof and dichlorosilane represents the halohydrides:

Equation 1

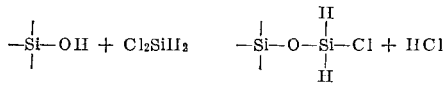

Equation 1a

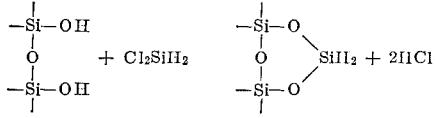

It is pointed out that the reaction between the halohydride and hydroxyl groups should be accomplished so as to minimize or totally avoid the type of reaction represented by Equation 1a as the solid products produced by reactions typified by Equation 1a cannot be further processed in accordance with the present invention to produce the catalysts of the present invention. The conditions which will minimize the reactions represented by Equation 1a are widely varied and are dependent upon many factors, including the inorganic solid utilized, concentrations and temperatures utilized, etc. These conditions can be readily arrived at for any particular set of factors The solid product (for example, the product of Equation 1) of the reaction of hydroxyl groups on the surface of an inorganic solid and a halohydride (this product is hereinafter referred to as the surface reacted solid) is reacted with a transition metal halide (defined in detail hereinafter) in order to produce the catalyst. In order that the proper reaction can take place between said surface reacted solid and a transition metal halide it is necessary that said surface reacted solid be hydrolyzed prior to contact thereof with the transition metal halide. It is believed that the following equation correctly illustrates the reaction which occurs when, in Equation 2 the solid product of Equation 1 is hydrolyzed:

Equation 2

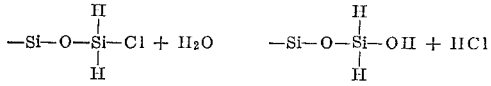

Although the conditions under which hydrolysis of said surface reacted solid product can be accomplished can be varied widely, it is generally sufficient that contact be made between said product and water (or water vapor) at room temperature for a period of about 1 hour. It should be noted that, in order to drive the reaction to substantial completion, it is normally preferable that excess water be utilized and that the hydrogen halide produced during the course of the reaction be eliminated from the reaction zone. Methods of eliminating the hydrogen halide product of the above hydrolysis reactions are generally analogous to those hereinbefore described.

It should be further noted that, although hydrolyzing agents other than water, such as sodium hydroxide or potassium hydroxide, are suitable for the purposes of the present invention, it is obviously normally most economical and convenient to utilize water.

The conditions under which reaction between the transition metal halide and the hydrolyzed surface-reacted solid can be accomplished are subject to considerable variation. However, in order to obtain a catalyst with high activity and reproducible character and performance, it has been found to be important that said hydrolyzed surface-reacted solid be essentially dry and anhydrous (i.e., free of molecular water in any form) at the time it is brought into contact with the transition metal halide.

Accordingly, it is much preferred that substantially all molecular water be removed from the hydrolyzed surface-reacted solid prior to contacting said solid with the transition metal halide. There are many means known to the art by which drying can be effected, such as by azeotropic distillation; purging said solid with a dry, inert, heated gas; etc. In addition, it is recommended that the reaction between the hydrolyzed surface-reacted solid and the transition metal halide be accomplished in such a manner as to allow by-products of the reaction to be eliminated from the reaction zone in order to thereby insure that said reaction goes to completion. Generally, the said reaction can be carried out by contacting said hydrolyzed surface-reacted solid with said transition metal halide, preferably in a solution thereof in an inert hydrocarbon medium, and maintaining the two reactants in intimate contact for a period of time sufficient to effect the desired chemical reaction resulting in the chemical bonding of the transition metal to the hydrolyzed surface-reacted solid. The length of time required to effect a given amount of such reaction and chemical bonding is largely dependent upon the temperature of the reaction mixture. Generally speaking, temperatures between about 0° C. and 125° C. and even higher temperatures can be used satisfactorily, but room temperature to about 105° C. is generally definitely preferred. Assuming provision is made for intimate contact of the dry, hydrolyzed surface-reacted inorganic solid and the transition metal halide, the *minimum* time required to accomplish the chemical reaction will vary from about 1 hours at room temperature to about 15 minutes at temperatures of 100° C. or over.

Elimination of by-products of the reaction from the reaction zone, i.e., from the reaction medium, can be accomplished in any convenient manner as discussed hereinbefore.

Transition metal halides, i.e., halide-type compounds of Group IVa, Va and VIa, suitable for the purposes of the present invention are the compounds conforming to the general empirical formula:

$$TO_aX_b$$

wherein T is a metal of Groups IVa, Va or VIa (where the group numbers correspond to the Mendeleev Periodic System); O is oxygen; $a$ is a number from 0 to 2; each X is any halogen; and $b$ is a number from 1 to 6.

Examples of suitable compounds conforming to said general formula are halides such as zirconium tetrachloride, vanadium tetrachloride, and titanium tetraiodide, and oxyhalides such as chromium oxychloride and vanadium oxychloride.

It is believed that the following equations correctly illustrate the reactions, which occur when in Equation 3 the solid product of Equation 2 is reacted with titanium tetrachloride:

Equation 3

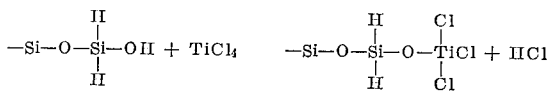

It is pointed out that the catalysts of the present invention (i.e., the solid product of Equation 3, for example) require activation by heating. Generally speaking, activation temperatures between about 100° C. and 200° C. and even higher can be used satisfactorily but a temperature range between about 130° C. and about 200° C. is usually to be preferred. The minimum time required to accomplish the activation will vary from periods of the order of about 10 hours at 100° C. to periods of about a few minutes (i.e., 5 minutes) at 200° C. or over. At higher temperatures, shorter periods of time are required;

at substantialy lower temperatures, the catalyst is either not formed at all or is of inferior quality. It is pointed out that in order to avoid premature activation of the catalyst product during reaction of the hydrolyzed surface-reacted solid with the transition metal halide and/or premature activation of the transition metal halide, it is necessary to utilize temperatures in accomplishing said reaction which are not sufficiently high to activate the catalyst product or cause premature reaction between the surface reacted solid and the transition metal halide. The appropriate temperatures to be utilized in any particular case can be readily determined.

Using the catalysts of this invention, polymerization and copolymerization of olefinic monomers can often be accomplished in the absence of liquids other than the monomers themselves, solvents or diluents, for example, in the gas phase, but it is usually more convenient to effect polymerization in the presence of a substantially inert liquid reaction medium. Accordingly, an inert liquid reaction medium is preferably supplied to the reaction zone.

Several classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are suitable for the purposes of the present invention. For example, straight run naphthas or kerosenes containing alkanes and cycloalkanes and liquid or liquefied alkanes such as n-hexane, 2,3-dimethylbutane, n-dodecane, dimethylcyclopentane, methyldecalins, and the like are suitable. Also, members of the aromatic hydrocarbon series, such as isopropyl benzene, ethyltoluene, hemimellitene, pseudocumene, isodurene, isoamylbenzene, and particularly the mononuclear aromatic hydrocarbons such as xylenes, mesitylene and xylene-p-cymene mixtures, and the like are completely suitable.

The quantity of catalyst to be utilized in the polymerization reaction may vary, the precise quantity selected for use being dependent upon the desired rate of polymerization, the geometry of the reaction zone, the composition of the particular olefinic charging stock, temperature and other reaction variables.

Harmful impurities in the liquid hydrocarbon reaction medium can be effectively neutralized prior to the formation therein, or addition thereto, of the catalyst or catalyst components of this invention by treating the liquid medium with a metal alkyl or a transition metal compound as disclosed in U.S. 2,991,151. The olefinic charging stocks can also be purified by any known means such as bubbling said stocks through a solution of a metal alkyl in a hydrocarbon solvent prior to their introduction into the polymerization reactor.

Temperature control during the course of the polymerization process can be readily accomplished when there is present in the reaction zone a large liquid mass having relatively high heat capacity. Accordingly, a liquid hydrocarbon reaction medium which can be cooled by indirect heat exchange with a suitable colant inside or outside the reaction zone is preferably supplied to the reaction zone.

The contact time or space velocity employed in the ploymerization process will be selected with reference to the other process variables such as the particular catalysts utilized the specific type of product desired, and the extent of monomer conversion desired in any given run or pass over the catalyst. In general, this variable is readily adjustable to obtain the desired results.

There follow a number of illustrative non-limiting examples:

*Example 1*

To a 2000 milliliter, glass, three neck reaction flask equipped with a stirrer, condenser and nitrogen inlet and outlet tubes there is charged 20 grams of "Cab-O-Sil," a pyrogenic silica produced by Cabot Corporation, and which has an average particle diameter of about 10 millimicrons and a hydroxyl group content on the surface thereof of about 1.5 milliequivalents per gram. Next, there is added to said vessel 1650 milliliters of toluene and the resulting slurry is dried by being heated to, and maintained at, the boiling point of toluene, i.e., about 110° C., for about 24 hours while a water/toluene azeotrope is removed from the reaction vessel by periodic distillation until 450 milliliters of distillate has been removed. The vessel is then cooled to 0° C. and charged with 20 millimoles of dichlorosilane—$Cl_2SiH_2$. The resulting slurry is then maintained at about 5° C. for about 48 hours with continuous stirring while the contents are swept with a stream of dry nitrogen. Subsequently, the extent of the reaction between the dichlorosilane and the hydroxyl groups on the surface of the silica is determined by measuring the quantity of HCl that was produced and by testing the liquid contents of the vessel for the absence therein of dichlorosilane, and the said silica is found to have 20 milliatoms of silicon bound to the surface thereof. Next, there is charged to the vessel over a period of about 2 hours about 15 millimoles of water, and the contents of said vessel are again stirred vigorously and swept with dry nitrogen for an additional hour. The extent of the reaction between the surface-reacted silica and the water is then determined by measuring the quantity of HCl that is produced and said surface-reacted silica is found to have about 10 milliequivalents of hydroxyl groups chemically bonded thereto. Next, the resulting slurry is azeotropically dried for about 8 hours according to the procedure hereinbefore described until about 400 milliliters of a water/toluene azeotrope is removed. Said azeotrope is then quantitatively tested for water and it is found that about 5 millimoles of water are present therein. The contents of the flask are then heated to, and maintained at, refluxing temperature, vigorously stirred and swept by dry nitrogen and there is charged dropwise thereinto 10 millimoles of titanium tetrachloride previously dissolved in about 400 milliliters of anhydrous toluene. After about 2 hours, the extent of reaction between hydroxyl groups and the titanium tetrachloride is determined by measuring the amount of HCl that was produced and by testing the liquid contents of the flask for the absence therein of titanium tetrachloride and it is found that about 10 milliatoms of titanium are bound to the surface of the solid.

180 milliliters of the titanated, surface-reacted silica slurry, comprising about 13 grams of said surface-reacted silica and 1.5 millimoles of titanium are transferred to a one-gallon, stainless steel, stirred autoclave. Said autoclave is then heated to and maintained at a temperature of about 190° C. for a period of about 2 hours. Next, the autoclave is cooled to and thereafter maintained at, about 80° C. and there is charged thereinto about 900 milliliters of anhydrous toluene, followed by pressurization to about 250 p.s.i. with ethylene. Thereafter, the autoclave is continuously stirred for about 2 hours and the pressure therein is maintained at about 250 p.s.i. by the periodic introduction thereinto of additional ethylene. The solid contents therein are then removed, dried, and weighed and it is found that solid polyethylene has been produced.

When, under the same conditions the catalyst slurry is not heated prior to the introduction of ethylene, no solid polymer is produced. Moreover, if redrying of the catalyst component following hydroxylation is not effected, subsequent polymerization at the above conditions results in a substantially lower yield of solid polymer.

*Example 2*

This example is essentially a duplicate of Example 1 with the exception that different starting materials are utilized in the production of the catalyst and polymerization is effected with butene-1 instead of ethylene.

There is introduced into a 2000 milliliter glass flask a slurry comprising 1650 milliliters of isooctane and 20 grams of "Alon," a pyrogenic alumina produced by Deutsche Gold- und Silber-Scheideanstalt vormals Roessler, and which has an average particle diameter of about 10–40 millimicrons and a hydroxyl group content on the surface thereof of about 0.7 milliequivalents per gram. Said slurry is then azeotropically dried for about 8 hours until about 450 milliliters of a water/isooctane azeotrope has been removed. After cooling to about ambient temperature, there is charged into the flask 9 millimoles of dibromogermane—$Br_2GeH_2$ and the resulting mixture is thereafter heated to a temperature of about 75° C. with continuous stirring for about 12 hours while the contents of said flask are swept with a stream of dry nitrogen. Subsequently, the extent of the reaction between the dibromogermane and the hydroxyl groups on the surface of the alumina is determined by measuring the quantity of HBr that was produced and by testing the liquid contents of the flask for the absence therein of dibromogermane. There is then charged to said flask about 12 millimoles of water and the contents thereof are heated to 80° C., stirred and swept with dry nitrogen for one hour. The extent of the reaction between the surface-reacted alumina and the water is then determined by measuring the quantity of HBr that is produced and the said surface-reacted alumina is found to have about 6 milliequivalents of hydroxyl groups chemically bonded thereto. The slurry is next redried by azeotropic distillation until about 400 milliliters of a water/isooctane azeotrope is removed. Next, said slurry is heated to and maintained at a temperature of about 90° C. and there is then charged dropwise thereinto a solution comprising 400 milliliters of anhydrous isooctane and 6 millimoles of vanadium oxychloride. After about 10 hours, the extent of the reaction between the hydroxyl groups bound to the surface-reacted alumina and the vanadium oxychloride is determined by measuring the amount of HCl that was produced and by testing the liquid contents of the flasks for the absence therein of vanadium oxychloride and it is found that about 6 milliatoms of vanadium are bound to the surface of the solid. Polymerization of the butene-1 is effected as follows:

360 milliliters of the vanadated, surface-reacted alumina slurry, comprising about 6 grams of the surface-reacted alumina and 1.8 milliatoms of vanadium are transferred to a 1000 milliliter stainless steel reaction bomb. Said bomb is sealed, heated to about 200° C. and rotated end over end for about 2 hours at a rate of about 30 r.p.m. Next, the bomb is cooled to about −30° C. in a calcium chloride ice bath and there is charged thereinto about 500 millimoles of liquid butene-1. The bomb is then resealed, removed from the cooling bath and rotated end over end at a rate of about 30 r.p.m. for about 2 hours at ambient temperature. Subsequently, examination of the solid contents of the bomb reveals that a solid butene-1 polymer has been produced.

The polymers produced in accordance with the present invention can be subjected to such aftertreatment as may be desired to fit them for particular uses or to impart desired properties. Thus, the polymers, can be extruded, mechanically milled, filmed or cast, or converted to sponges or latices. Also antioxidants, stabilizers, pigments, insecticides, fungicides, etc., can be incorporated into the polymers.

Obviously, many changes can be made in the above Examples and procedures without departing from the scope of the invention.

For example, although only titanium tetrachloride and vanadium oxychloride are utilized in the above Examples, other Group IV$a$, V$a$ and VI$a$ transition metal halides and oxyhalides such as titanium tetrafluoride, zirconium tetrachloride and chromium oxychloride are also suitable for the purposes of the present invention.

Further, pyrogenically coformed, or coprecipitated metal oxides, or metal oxides coformed with, or mixed with, other compounds are suitable choices for the practice of the invention.

Accordingly, it is intended that the above disclosure be regarded as illustrative and as in no way limiting the scope of the invention.

What I claim is:

1. A compound which can be activated by heating to produce an active polymerization catalyst which comprises an inorganic solid having chemically bound to the surface thereof at least about $1 \times 10^{-4}$ equivalents per gram of surface structures conforming to the formula:

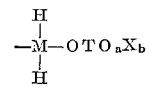

where M is a quadrivalent metal of Group IV$b$ of the Mendeleev Periodic Table; each H is hydrogen; each O is oxygen; T is chosen from the group consisting of the metals of Group IV, V$a$ and VI$a$; $a$ is a number from 0 to 2; each X is any halogen; $b$ is a number from 1 to 5; and where M is chemically bonded directly to one oxygen atom on the surface of said inorganic solid.

2. The compound of claim 1 wherein M is silicon; $a$ is 0; and T is a metal of Group IV$a$.

3. The compound of claim 1 wherein said surface structures consist predominantly of

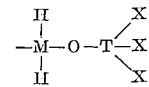

wherein M is silicon, T is titanium and each X is chlorine.

4. The compound of claim 1 wherein M is silicon and T is a metal of Group V$a$.

5. The compound of claim 1 wherein said inorganic solid has an average particle diameter below about 0.1 micron and at least about $1 \times 10^{-4}$ gram atoms of T chemically bonded to the surface thereof per gram.

6. A process for producing a compound which can be activated by heating to produce a polymerization catalyst which comprises
   (a) reacting hydroxyl groups on the surface of an inorganic solid having at least about $1 \times 10^{-4}$ equivalents per gram of hydroxyl groups chemically bound to the surface thereof with a compound conforming to the formula

wherein M is chosen from the group consisting of the quadrivalent metals of Group IV$b$; each H is hydrogen; and each X is any halogen,
   (b) hydrolyzing the product of (a), and
   (c) reacting the hydrolyzed product with a compound conforming to the formula $TO_aX_b$ wherein T is chosen from the group consisting of the metals of Groups IV$a$, V$a$ and VI$a$; each O is oxygen; $a$ is a number from 0 to 2; each X is any halogen; and $b$ is a number from 1 to 6.

7. The process of claim 6 wherein said inorganic solid has an average particle diameter below about 0.1 micron and at least about $1 \times 10^{-4}$ equivalents of hydroxyl groups on the surface thereof per gram.

8. The process of claim 6 wherein in the formula

M is silicon.

9. The process of claim 6 wherein in the formula

M is germanium.

10. The process of claim 6 wherein in the formula

M is tin.

11. The process of claim 6 wherein said compound conforming to the formula $$TO_aX_b$$

is titanium tetrachloride.

12. A process for polymerizing a substance chosen from the group consisting of a mono-olefin, mono-olefins, a di-olefin, di-olefins, and mixtures thereof which comprises contacting said substance at temperatures between about 25° C. and about 250° C. with a catalyst formed by heating to temperatures between about 100° C. and about 200° C. an inorganic solid having chemically bound to the surface thereof at least about $1 \times 10^{-4}$ equivalents per gram of surface structures conforming to the formula

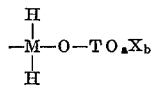

where M is a quadrivalent metal of Group IV*b* of the Mendeleev Periodic Table; each H is a hydrogen; each O is oxygen; T is chosen from the group consisting of the metals of Groups IV*a*, V*a* and VI*a*; *a* is a number from 0 to 2; each X is any halogen; *b* is a number from 1 to 5; and where M is chemically bonded directly to one oxygen atom on the surface of said inorganic solid.

13. The process of claim 12 wherein the inorganic solid having surface structures bound thereto is heated to temperatures between about 130° C. and about 200° C.

14. The process of claim 12 wherein said surface structures bonded to the surface of the inorganic solid consist predominantly of

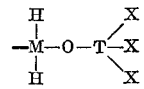

where M is silicon; each H is hydrogen; each O is oxygen; T is titanium and each X is chlorine.

References Cited by the Examiner
UNITED STATES PATENTS

| | | | |
|---|---|---|---|
| 3,008,943 | 11/1961 | Guyer | 260—94.9 |
| 3,031,514 | 4/1962 | Kosmin | 260—94.9 |
| 3,048,574 | 8/1962 | Wiberg et al. | 260—94.9 |

JOSEPH L. SCHOFER, *Primary Examiner.*

F. L. DENSON, *Assistant Examiner.*